United States Patent Office 3,332,855
Patented July 25, 1967

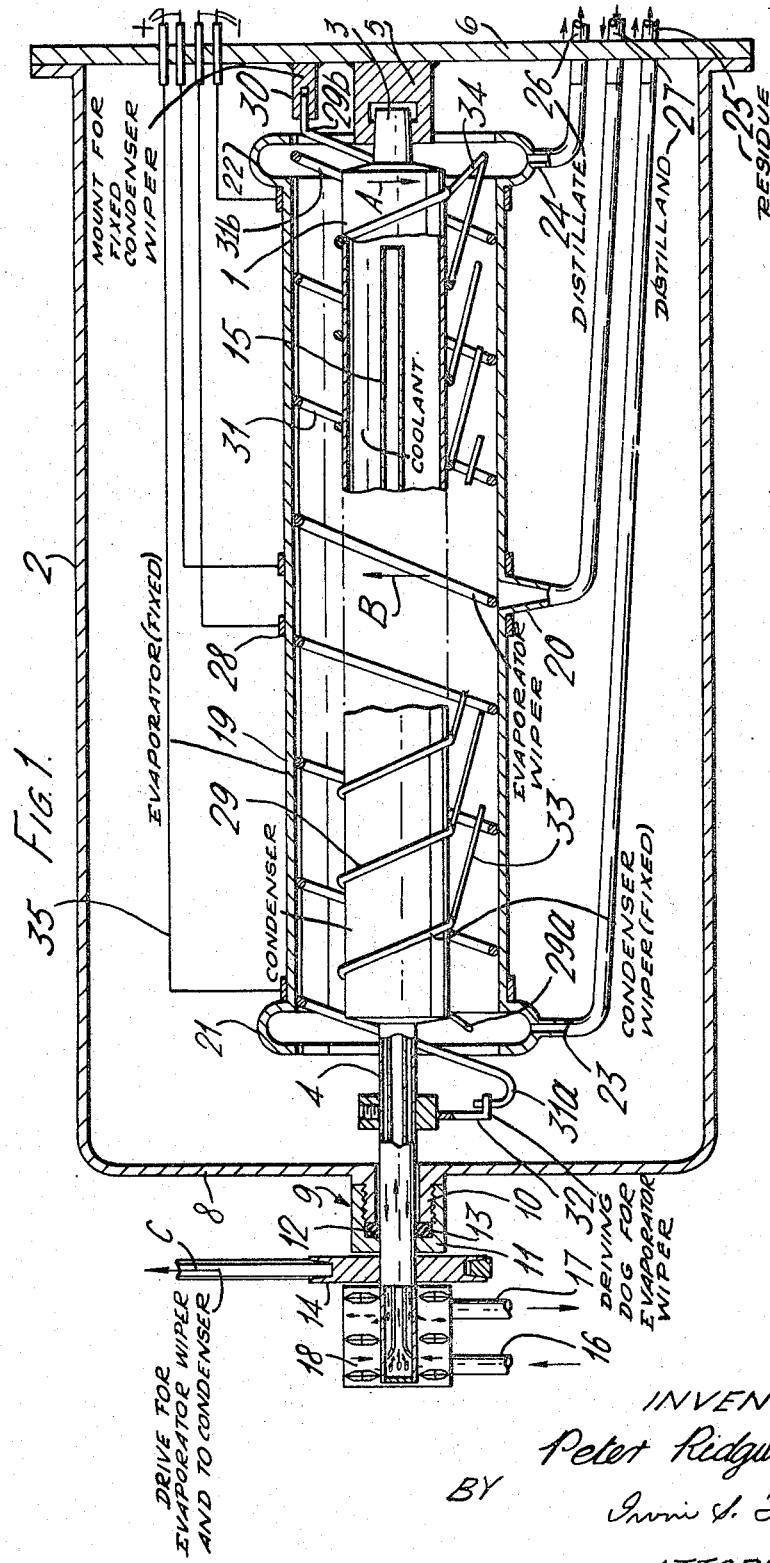

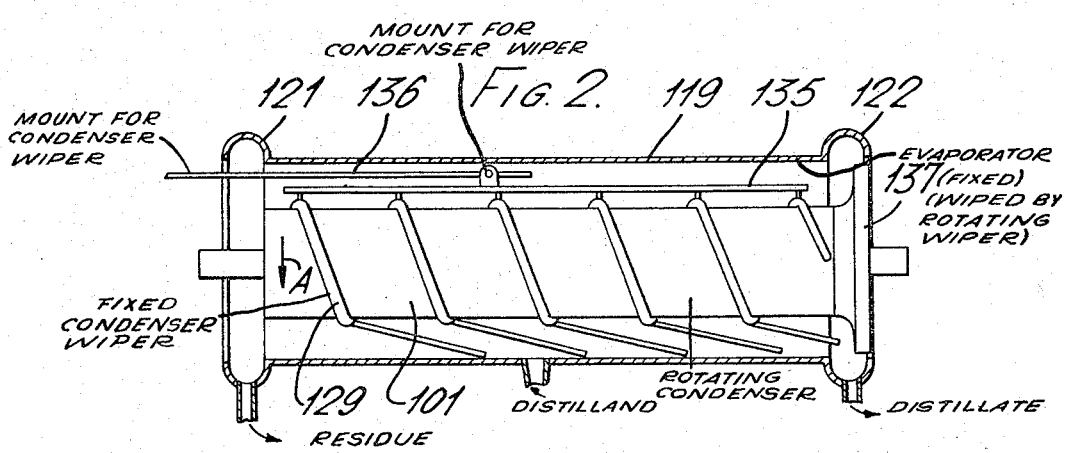
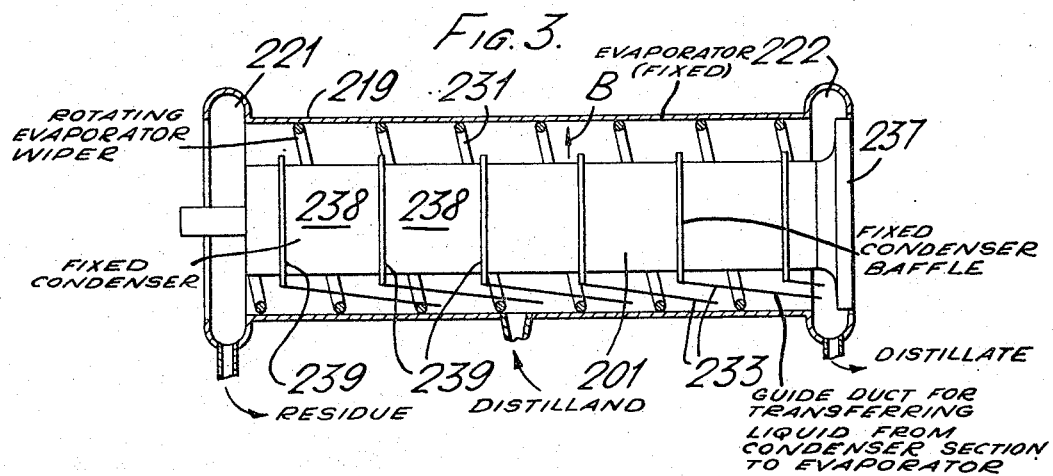
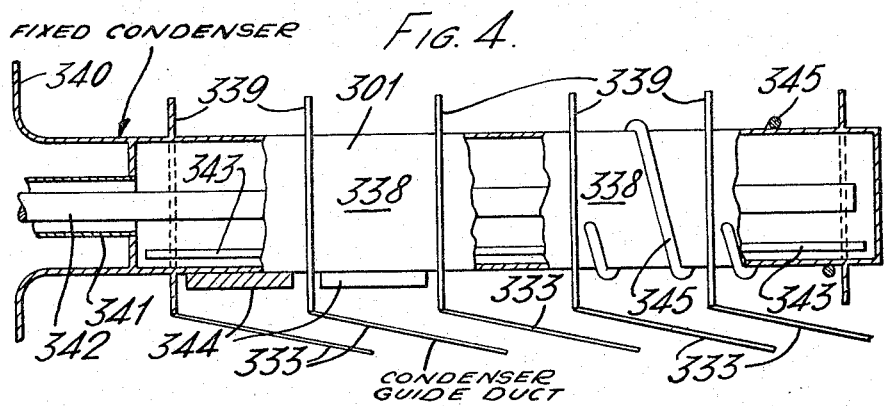

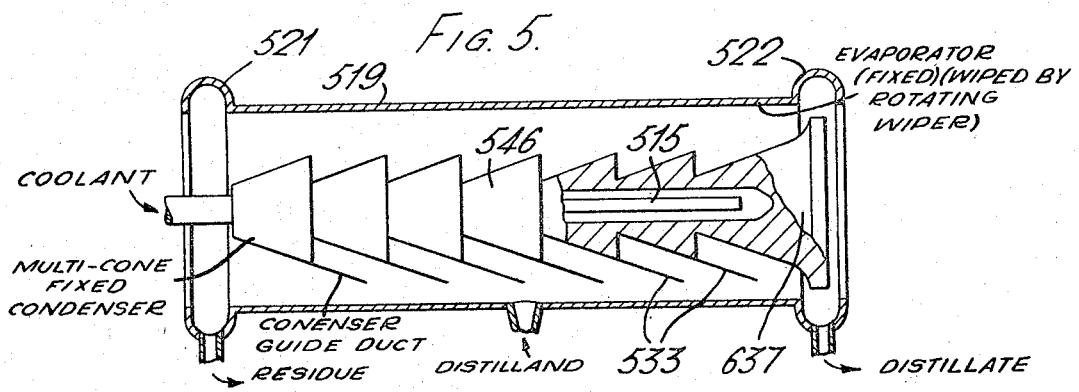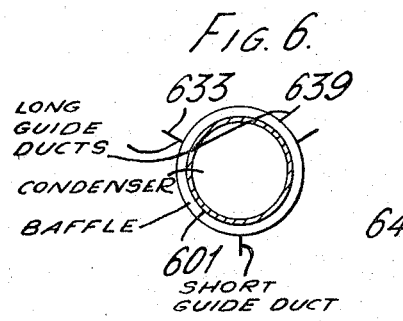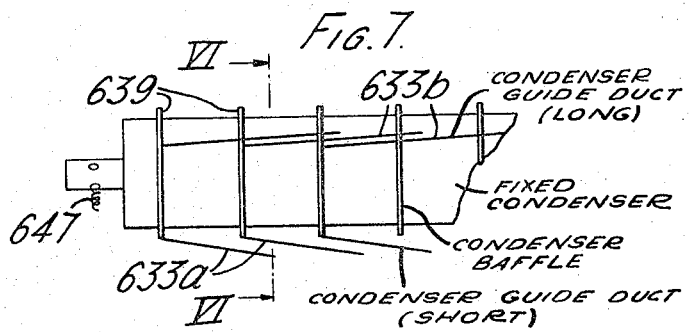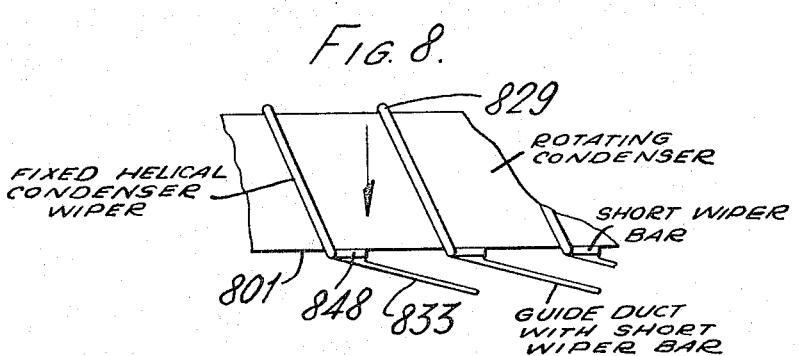

3,332,855
MOLECULAR STILL OF THE ROTARY WIPED FILM TYPE
Peter Ridgway Watt, Ashtead, England, assignor to Vitamins Limited, London, England, a British company
Filed Dec. 16, 1963, Ser. No. 330,733
Claims priority, application Great Britain, Jan. 2, 1963, 289/63
8 Claims. (Cl. 202—236)

This invention relates to molecular distillation apparatus.

Various kinds of molecular still are known in which distilland is caused to undergo a plurality of distillations, distillate being caused to progress to one end of the still whilst residual distalland passes to the other end. It is desirable that the film of distilland should be kept thin so that evaporation may proceed rapidly and overheating should be avoided, and various means are known by which this may be accomplished, such as wiping and/or rotating the evaporator surface. Various means are also known for causing the residual distilland to pass to the desired end of the still.

The still according to the present invention includes novel and simple mechanical means for effecting the desired movement of the residual distalland.

The still is of the kind in which a cylindrical or conical evaporator surrounds a similarly-shaped condenser, and it is a feature of the invention that the wiping arrangements for both the evaporator and condenser surfaces take up little space so that the surfaces can be placed in closed juxtaposition so as to give efficient fractionation.

Various arrangements of the still according to the invention are possible by which distillate is caused to move along the condenser surface, in the reverse direction to the movement of distalland along the evaporator surface; where viscous distillates are expected, the means for effecting this movement of distallate also wipes the film to cause it to fall off the condenser after a certain amount of legthwise movement so that it may then be redistilled.

Distillation apparatus according to the invention comprises a tubular condenser surface which is symmetrical about an axis of revolution and a tubular evaporator surface which is symmetrical about an axis of revolution and which surrounds and is generally parallel to the condenser surface, the evaporator surface being contacted along substantially its entire length by a helical wiper screw, the evaporator surface and the wiper screw being relatively rotationally movable and the direction of relative rotation and the hand of the wiper screw being arranged to cause axial displacement of liquid relative to such surface.

Preferably, the evaporator is stationary and the wiper screw is rotated with respect thereto.

In one preferred embodiment, the condenser surface is wiped by another helical wiper.

The condenser and evaporator surfaces are normally cylindrical, but if it is expected that substantially more distillate than residue, or vice versa, will be obtained from a particular distillate, then a still of appropriate conical shape may be used.

The invention will be described with reference to certain preferred embodiments, as shown in the accompanying drawings, in which FIG. 1 shows in part-elevational axial section an entire distillation apparatus according to the invention, including a condenser arrangement suitable for viscous liquids;

FIG. 2 shows in side elevation the evaporator, condenser and condenser wiping arrangement of FIG. 1, with two slight modifications;

FIG. 3 shows the same parts of the still as in FIG. 2, but depicts a second condenser arrangement, which is suitable for nonviscous liquids, and FIG. 4 shows in part-elevational axial section a modification of the condenser arrangement of FIG. 3, which includes two further wiper embodiments suitable for use with viscous liquids;

FIG. 5 shows a further condenser arrangement suitable for nonviscous liquids,

FIGS. 6 and 7 show in end and side view respectively yet a further stationary condenser arrangement which is adjustable to alter the fractionating power of the still; and FIG. 8 shows a further modification of FIG. 1.

Referring to FIG. 1, a closed cylindrical hollow condenser 1 is mounted with its axis substantially horizontal and concentrically inside a cylindrical vacuum chamber 2 on stub shafts 3, 4, the shaft 3 being rotatably mounted in a stationary bearing 5 provided on the inner face of an end plate 6 of the chamber 2. The condenser preferably is made of metal or glass, e.g. stainless steel or borosilicate glass. At the other end of the condenser 1, the shaft 4, which is hollow, passes through the end wall 8 of the chamber 2 and through a fixed bearing and shaft seal 9 provided on the outer face of the wall 8, which bearing 9 enables the shaft 4 to rotate therein. The bearing 9 is formed in two parts by a cylindrical axial extension 10 of the end wall 8 provided with an outer screw thread, and a cylindrical cap member 11 provided with an inner screw thread cooperable with the outer screw thread of the extension 10, so that when the member 11 is screwed on to the extension 10 an annular recess 12 is provided for receiving a vacuum sealing ring 13, for preventing leakage of the atmosphere into the vacuum chamber 2. A condenser drive mechanism, such as a pulley 14, is mounted on the shaft 4 adjacent the bearing 9. A water or other coolant conduit 15 passes concentrically through the shaft 4 into the condenser 1 and is connected to feed and discharge conduits 16, 17 within a swival joint member 18 provided on the free end of the shaft adjacent the pulley 14.

A hollow cylindrical stationary evaporator 19 is mounted concentrically inside the chamber 2, encasing the condenser 1 and having substantially the same length. A feed inlet 20 for the distalland is provided on the lower periphery of the evaporator 19 substantially at the midpoint of its length. Liquid collecting gutters 21, 22 are formed at each end respectively of the evaporator 19 for receiving distillate residue and distillate respectively. An outlet duct 23 is provided at the lowermost extremity of the residue gutter 21 and an outlet duct 24 is provided similarly for the distillate gutter 22. The residue and distillate are discharged from the chamber 2 by connection members 25, 26 respectively, which pass through the end plate 6. Similarly the distilland inlet 20 is joined to a connection member 27 which also passes through the end plate 6 and is connected to a source (not shown) of liquid to be distilled. Bands 28 of electrically conducting material are mounted around the outer circumference of the evaporator 19 preferably as shown in the drawing. Electrical heating elements can be attached to these bands 28 and low-voltage electric current is fed thereto from the positive and negative terminals shown embedded in the end plate 6 via leads 35 if the evaporator 19 is of glass, an electrically conductive coating is applied to its surface so as to connect the bands 28.

A wiper member of helix 29 preferably in the form of a light spring is wound around the outer surface of the condenser 1 in wiping contact therewith, one end 29a being free and the other end 29b being fixedly connected to an anchorage member 30.

A second wiper member or helix 31 preferably also in the form of a light spring of greater helix diameter is wound around the inner surface of the evaporator 19 in contact therewith, with one end 31b free and the other end 31a rotationally connected to a driving dog 32 attached to the shaft 4. The helices can be made of a flexible metal or plastic or ground glass and either or both may if desired be braced longitudinally (see FIG. 2) to avoid excess relative movement of the separate turns thereof.

Drainage wires, filaments or ducts 33 are attached to the lowermost extremity of each turn of the condenser helix 29 and all are inclined downwardly at substantially the same angle to the vertical, their lower ends terminating just above the lowest part of the surface of the evaporator 19. The direction of inclination of the ducts 33 is the same and their length such that their lower ends terminate a distance along the evaporator equal to one or more turns of helix 29, i.e. preferably 1 to 1½ pitch lengths. This distance can of course be altered by variation of the pitch of the helix 29 or the length of the ducts 33 according to the degree of distillation required.

In operation, the shaft 4 is rotated by a drive belt passing over the pulley 14, as indicated by the arrow C, whereby the condenser 1 is rotated in the direction shown by the arrow A. The helix 29 remains stationary due to its anchorage at 30, whilst the condenser 1 rotates therein, whereby the turns of the helix cause relative wiping movement over the outer surface of condenser 1. Since as shown the direction of rotation of the condenser 1 (arrow A) is underrunning and the hand of the helix 29 which is fixed (or non-rotating) is the same, this wiping movement causes distillate to be displaced axially of the apparatus towards the gutter 22. Rotation of the shaft 4 also rotates the driving dog 32 in the same direction A (underrunning) as the condenser. This forces the helix 31 to rotate around the inner surface of the evaporator 19, in the direction of the arrow B, whereby the turns of the helix 31 cause relative wiping movement over the surface of the evaporator 19 and movement of residue to the left.

The distilland is fed through the inlet 20 by a pump or like means (not shown) and the heating elements attached to conducting bands 28 heat the evaporator 19, whereby evaporation occurs and the resultant vapour condenses upon the condenser 1 and residue collects on the surface of the evaporator. The vapour is cooled upon contact with the condenser 1, which in turn is cooled by cold water passing through the conduit 15. The vapour condenses to form a liquid film on the outer surface of the condenser 1 which film is wiped along the condenser surface by the turns of the helix 29 as described above until it comes into contact with the drainage ducts 33, which return the liquid to the bottom of the evaporator for redistillation at an axially displaced region therealong. In this way, the liquid undergoes repeated evaporation and condensation cycles whilst simultaneously progressing along the length of the evaporator, in this case from left to right of the drawing. At the right-hand end of the condenser the liquid film is discharged into the gutter 22 down the end duct 34 which is more sharply inclined than the other ducts 33 and falls into the distillate outlet 24. The liquid residue is wiped along the inner surface of the evaporator 19 by rotation of the helix 31, in a longitudinal direction opposite to that of the distillate (to the left of the drawing) and received at the other end of the evaporator in the gutter 21 thereof and led away through the outlet 23.

The speed of rotation of the shaft 4 determines the speed at which the films of residue and distillate move towards their respective outlets.

The advantage of this arrangement is the simple manner in which the liquid film can be wiped from the surfaces of the evaporator and condenser without need of a plurality of wiping members filling up the space between the evaporator and condenser. This free space provides a greater pumping efficiency of the apparatus.

In an alternative form the condenser 1 and helix 31 may be made to rotate independently at variable speeds and variations in the relative movement of the residue and distillates may be effected by using helices of different pitch.

In FIG. 2, two modifications of the apparatus of FIG. 1 are illustrated. FIG. 2 shows only the evaporator 119 with terminal gutters 121 and 122 surrounding the condenser 101 around which passes the helical wiper 129; the vacuum chamber, evaporator helix and other parts shown in FIG. 1 have been omitted.

If the helical condenser wiper 129 is made of resilient material such as metal, it tends to become "wound up" as the condenser rotates (arrow A), which could have a braking effect and could cause damage, the separate turns of the helix 129 are therefore in FIG. 2 secured one to another, their uppermost points being joined by a rigid rod 135 parallel to the condenser axis and itself carried by a fixed rod 136 secured to a fixed part of the apparatus. FIG. 2 also illustrates an improvement in the condenser 101 per se, which includes an optical baffle 137 or other form of total condenser section in the region of the take-off gutter 122, in order to avoid vapour losses through redistillation from the vicinity of such gutter.

FIG. 3 also shows an embodiment in which an optical baffle 237 or other total condenser forms the end of the condenser 201. The evaporator is shown at 219 with its gutters 221 and 222 and, in this case, the associated rotary helix or wiper 231. The condenser 201 is distinguished from those shown in FIGS. 1 and 2 by being stationary and taking the form of a hollow cylinder or tube closed at one end and connected at the other to a source of coolant. The condenser 201 has its surface divided into a plurality of condenser zones 238 by means of annular baffle plates 239 surrounding it, each carrying an inclined distillate guide 233 at its lowermost point arranged to deliver distillate collecting in one zone 238 to the region of the evaporator 219 opposing the next zone 238. There is thus lateral transfer along the condenser, but no wiping action, and the distillate must therefore be mobile enough to fall down the condenser in a thin film without wiping.

FIG. 4 also shows a stationary form of condenser 301 confining a cylinder divided into axial zones 338 by baffle plates 339 themselves carrying guides 333. The cylinder also carries a baffle section 340 and axial coolant connections 341 and 342. FIG. 4 illustrates two different forms of magnetically actuated condenser wiper mechanism. The condenser 301 houses, as shown generically at 343, a source of a rotary magnetic field. In the embodiment shown at the left in FIG. 4, each zone 338 is associated with a magnetic wiper bar 344 which is magnetically attracted against the condenser surface and undergoes a wiping movement relative to such surface as the field source 343 rotates. In the embodiment shown in the right-hand half, the actual wiper member is a helical wire or other member 345, which effects wiping of its associated condenser zone 338 and displacement of the distillate axially.

FIG. 5 illustrates a further form of stationary condenser which is made up of truncated cones 546. A distillate drainage duct 533 is attached to the lowermost point of each one. At the distillate end of the condenser there is a total condenser section 637; the coolant conduit 515 extends inside the hollow condenser; the evaporator 519, gutters 521 and 522, and the evaporator helix and other parts are similar to those of FIG. 1 or 2.

In operation, the distillate which is condensed on each of the cones 546 runs down the cone, passes down the duct 533 attached to that core, falls onto the evaporator and is redistilled.

FIGS. 6 and 7 show a modification of the condenser of FIG. 2; the baffle plates 639 mounted on the condenser 619 bear three sets of distillate ducts 633 instead of one set. Each set of ducts is of different length; thus in FIG. 7 the lowermost ducts 633a are about 1½ times the length of a zone between adjacent baffle plates 639, whilst the upper set 633b are nearly 2½ times the length of a zone. The condenser is mounted so that it can be turned before use to bring a desired set of ducts lowermost and it is held in such position by any suitable means, such as the indicated ball and socket arrangement 647. By such choice of ducts of a particular length, the fractionating power and throughput of the still can be adjusted as desired.

Ducts of different lengths as shown in FIGS. 6 and 7 can also be used with a condenser of the kind shown in FIG. 5.

FIG. 8 is a fragmentary view of a portion of FIG. 1, showing the condenser 801, helical wiper 829 and ducts 833. Short horizontal bars 848 are here attached to the wiper 829; these serve to give a firmer mounting to the ducts 833 and they also act as wipers in the manner of the bars 344 of FIG. 4, and assist in removing viscous distillate from the condenser.

A further embodiment of the condenser suitable for use with non-viscous liquids consists in a helix fixed to the condenser. This may be envisaged as being the same as is shown in FIG. 1, except that the helix 29 is integral with the condenser 1, and the ends 29a and 29b do not project beyond the ends of the condenser. In operation, the condenser is rotated slowly. This condenser is relatively simple to construct.

The terms "viscous" and "non-viscous" as used hereinbefore refer broadly to liquids which tend to remain on the condenser surface, and to those which drop off it relatively freely.

Various modifications of the illustrated embodiments are possible.

When the evaporator is surrounded by a vacuum jacket as in FIG. 1, it is necessary to use low-voltage electric current to prevent arcing between the bands 28. If however the evaporator tube 19 is itself rendered vacuum tight and evacuated through an axial vacuum connection, the bands 28 are in air and mains voltage (e.g. 200–250 v.) can be used. A separate vacuum jacket 2 can thus be dispensed with, but it may be necessary to surround the evaporator with a glass tube to prevent persons inadvertently touching the evaporator from experiencing electric shocks, and also in order to give some thermal insulation.

It would be possible to rotate the evaporator 19 and keep the helix 29 stationary, but the connections to the bands 29 and to the gutters 23, 24 and the feed inlet 20 would then be more difficult to effect.

The distillate ducts 33 on the residue gutter side of the still (i.e., to the left of the feed inlet 20 in FIG. 1) may be omitted, and a trough included under the portion of the condenser which would have been served by these ducts, such trough sloping downwardly toward the distillate gutter end of the still and discharging just on the distillate side of the feed inlet. Distillate from all the portions of the condenser on the residue side of the feed inlet may thus be returned in a single step to the region of the feed inlet.

I claim:

1. A molecular still which comprises a tubular condenser having a surface which is symmetrical about a horizontal axis of revolution, a tubular evaporator having an interior surface which is fixed and symmetrical about said horizontal axis of revolution, said evaporator surface surrounding and being generally parallel to and facing the condenser surface, a first helical wiper member in contact with said evaporator surface over substantially the entire length of said evaporator surface, a second helical wiper member in contact with said condenser surface over substantially the entire length of said condenser surface, a residue gutter at one end of said evaporator surface, a distillate gutter at the other end of said evaporator surface, a plurality of guide ducts attached to the second wiper member at the underside of the condenser, and a distilland feed inlet into the evaporator located between the residue and distillate gutters, said first helical wiper member being rotatable about the horizontal axis of the evaporator surface so as to cause axial displacement of liquid along the evaporator surface towards said residue gutter, said condenser being rotatable about its horizontal axis and said second helical wiper member being stationary so as to cause axial displacement of distillate along the guide ducts in the direction towards the distillate gutter.

2. A molecular still which comprises a tubular condenser having a surface which is symmetrical about a horizontal axis of revolution, a tubular evaporator having an interior surface which is fixed and symmetrical about said horizontal axis of revolution, said evaporator surface surrounding and being generally parallel to and facing the condenser surface, a helical wiper member in contact with said evaporator surface over substantially the entire length of said evaporator surface, a residue gutter at one end of the evaporator surface, a distillate gutter at the other end of the evaporator surface, a distilland feed inlet into the evaporator located between the residue and distillate gutters, a plurality of annular baffle plates perpendicular to the condenser and surrounding same, a guide duct attached to the underside of each baffle plate adapted to direct distillate in the direction towards the distillate gutter, the helical wiper member being rotatable about the horizontal axis of the evaporator surface so as to cause axial displacement of liquid along the evaporator surface towards the residue gutter.

3. A still as claimed in claim 2, in which at least two sets of guide members are provided on the condenser, the guide members of each set being of different length from those of the other set or sets, and the condenser is mounted so that it can be turned to bring a desired set into lowermost, operative position.

4. A still as claimed in claim 2, in which the evaporator surface is surrounded by a separate vacuum jacket.

5. A molecular still, which comprises a tubular condenser having a condensing surface which is symmetrical about a horizontal axis of revolution, a tubular evaporator having an interior evaporating surface which is symmetrical about said horizontal axis of revolution, the evaporator surrounding and being parallel to the condenser, a helical wiper screw disposed within said evaporator and adapted to contact said evaporating surface over substantially the entire length of said evaporating surface, said evaporator being stationary and said helical wiper member being rotatable about said horizontal axis, a residue gutter disposed at one end of said evaporator for collecting distillation residue, a distillate gutter disposed at the other end of said evaporator for collecting distillate liquid, a distilland feed inlet disposed between said gutters for feeding distilland to the evaporator at a point between the respective ends thereof, the hand of the helical wiper being adapted on rotation of said helical wiper within the stationary evaporator to cause axial displacement of liquid along the evaporating surface in a direction toward said residue gutter and a plurality of stationary transfer means disposed at spaced locations along said condenser for transferring distillate from the respective axial portion of the condenser to a portion of the evaporator located nearer to the distillate gutter.

6. A molecular still as claimed in claim 5, in which the tubular condenser is cylindrical and mounted for rotation about said horizontal axis, said condenser being disposed within a second helical wiper member which contacts said condensing surface over substantially the entire length of the condensing surface, the condenser being adapted to rotate in the same direction of rotation as the first-mentioned helical wiper member and the stationary, second-mentioned helical wiper member having a hand adapted to displace liquid axially of the condenser towards the distillate gutter, said transfer means including distillate conveying guide members attached to the second-mentioned helical wiper member in the region of the underside of said condenser.

7. A molecular still as claimed in claim 5, in which the tubular condenser is cylindrical and mounted for rotation about said horizontal axis, said condenser being disposed within a second helical wiper member which contacts said condensing surface over substantially the entire length of the condensing surface, a fixed rigid rod being secured to the respective turns of said second helical wiper member in the region above said condenser, the condenser being adapted to rotate in the same direction of rotation as the first-mentioned helical wiper member and the stationary, second-mentioned helical wiper member having a hand adapted to displace liquid axially of the condenser towards the distillate gutter, said transfer means including distillate conveying guide members attached to the second-mentioned helical wiper member in the region of the underside of said condenser.

8. A molecular still as claimed in claim 5, in which the tubular condenser has a surface in the form of a plurality of truncated cones, the common axis of said cones being coincident with said horizontal axis of revolution, all of said cones being disposed with their bases directed towards the distillate gutter, said transfer means including guide members attached to the bases of the cones at the underside of the condenser and adapted to deposit liquid from the respective condenser cone on a portion of the evaporating surface nearer to the distillate gutter.

References Cited
UNITED STATES PATENTS

| | | | |
|---|---|---|---|
| 2,224,621 | 12/1940 | Voorhees | 202—236 X |
| 2,562,153 | 7/1951 | Taylor | 202—236 X |
| 2,927,634 | 3/1960 | Gudheim | 159—6 |
| 2,975,108 | 3/1961 | Watt | 202—236 X |
| 2,993,842 | 7/1961 | Smith | 259—6 X |
| 3,020,211 | 2/1962 | Smith | 159—6 X |
| 3,090,732 | 5/1963 | Pinkwart et al. | 202—236 |
| 3,250,687 | 5/1966 | Frank | 159—13 X |

NORMAN YUDKOFF, *Primary Examiner.*

J. SOFER, *Assistant Examiner.*